United States Patent [19]

Fischer

[11] 4,094,054
[45] June 13, 1978

[54] METHOD OF SECURING AN OBJECT TO A LOW-STRENGTH SUPPORT STRUCTURE

[76] Inventor: Artur Fischer, Weinhalde 34, Tumlingen, Germany

[21] Appl. No.: 617,832

[22] Filed: Oct. 1, 1975

Related U.S. Application Data

[63] Continuation-in-part of Ser. No. 616,072, Sep. 23, 1975, abandoned.

[30] Foreign Application Priority Data

Oct. 3, 1974 Germany .............................. 2447189

[51] Int. Cl.² .................... B23P 3/00; B23P 19/04
[52] U.S. Cl. ..................................... 29/460; 29/523; 29/526 R; 52/704; 85/84; 403/265; 403/277
[58] Field of Search .............. 29/460, 523, 526; 52/704, 743, 744; 85/83, 84; 264/46.5, 46.6

[56] References Cited

U.S. PATENT DOCUMENTS

| | | | |
|---|---|---|---|
| 1,138,219 | 5/1915 | Hottenroth | 85/83 |
| 3,288,896 | 11/1966 | Hendricks | 264/46.5 |
| 3,298,144 | 1/1967 | Fischer | 52/704 X |
| 3,308,585 | 3/1967 | Fischer | 52/704 X |
| 3,383,152 | 5/1968 | Ward | 264/46.5 X |
| 3,594,836 | 7/1971 | Robertson | 264/46.5 X |
| 3,621,557 | 11/1971 | Cushman et al. | 29/460 |

FOREIGN PATENT DOCUMENTS

2,420 of 1913 United Kingdom .................... 85/83

Primary Examiner—Charlie T. Moon
Attorney, Agent, or Firm—Michael J. Striker

[57] ABSTRACT

A method and an arrangement for securing an object to a low-strength support structure includes inserting an anchor member into an anchoring hole provided in the support structure with clearance. The anchor member has an internal passage that extends from its leading end towards its trailing end and which communicates with the anchoring hole. A device is inserted into the passage and ejects a quick-setting substance into the passage and from there to the immediate exterior of the anchor member so that the substance surrounds the anchor member and forms a plug thereabout. The plug partially fills the clearance and fixes the anchor member securely in the anchoring hole upon the hardening of the substance. A flange is provided at the trailing end of the anchor member to seal the anchor hole against outflow of the quick-setting substance therefrom.

6 Claims, 1 Drawing Figure

U.S. Patent
June 13, 1978
4,094,054
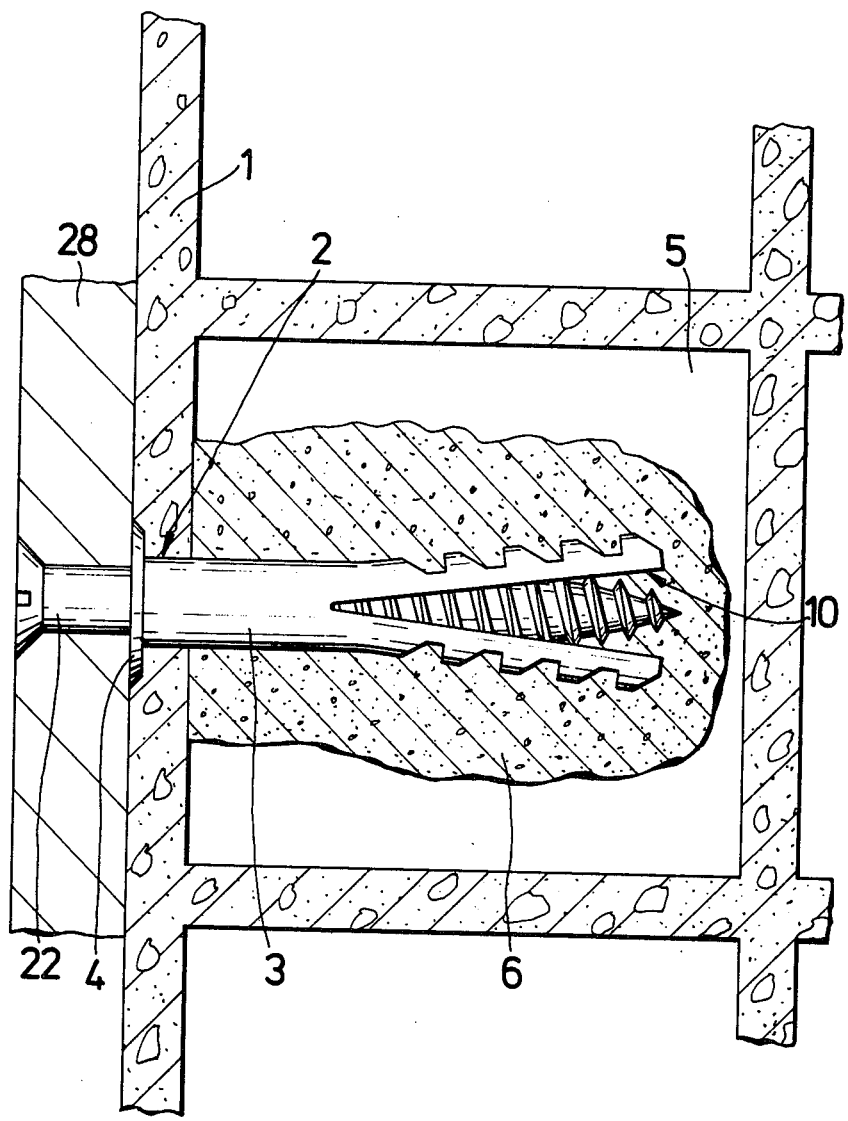

METHOD OF SECURING AN OBJECT TO A LOW-STRENGTH SUPPORT STRUCTURE

CROSS-REFERENCE TO RELATED APPLICATIONS

The present application is a continuation-in-part of the U.S. application having Ser. No. 616,072, filed on Sept. 23, 1975, now abandoned, by the applicant, and having the title "Method and Arrangement for Mounting an Object to a Low-Strength Support Structure."

BACKGROUND OF THE INVENTION

The present invention relates to a method and an arrangement for securing an object to a support structure and, more particularly, to the secure mounting of an object to a low-strength support structure, such as a porous masonry wall or a block-like structure having interior hollow cavities.

In general, the prior art has encountered very serious difficulties when it is desired to mount an object, such as a cladding panel, onto a low-strength support structure. Because such structures are typically porous and usually have large vacant cavity areas, they have a very low resistance to fracture and thus do not provide an adequate surface for an object to be securely mounted thereon. In the case where an expansion anchor member is placed in an anchoring hole which is provided in the low-strength support structure and radially expanded, the support structure is especially subject to crumbling. It will be appreciated that the inner circumferential wall of such anchoring holes are so destroyed, the clamping force which secures the object to the support structure is no longer sufficient to perform its function. Once destroyed, the anchor hole can no longer be used anymore for mounting purposes.

In porous block-like supporting structures having interior hollow cavities separated by partition walls, it is known to utilize an extra-long dowel whose length is selected so that it can engage and grip several of the partition walls in the interior of the support structure. Such oversized dowels usually have spreadable elements which are adapted to engage a large area at the rear sides of the partition walls. Thus, as a result of distributing the expansion pressure force over several partition walls, a large extraction force is required to remove an object from the support. However, even with this prior-art approach, one still subjects the interior of the structure to some crumbling. Moreover, the higher anchoring values frequently necessary to mount a heavy object on a support cannot always be achieved. Finally, not only are the spreadable elements costly to manufacture, but this approach cannot be successfully used when the support structure is relatively thin.

In other porous material structures, the prior art teaches the use of adhesives to improve the holding strength or retention of the anchoring member. However, the retention properties of the dowel are limited by the low breaking strength of the masonry material and, moreover, the adhesive technique cannot be effectively used for block-type walls having interior cavities.

It is also known in the prior art to mortar or cement dowels in place in an anchoring hole provided in the masonry. Such an anchoring hole has a cross-section which is considerably larger than the cross-sectional measurement of the dowel or anchoring member. Thereupon, the anchoring hole is filled with a cement mixture, and then the dowel is inserted into this mixture. In order to ensure that the dowel is correctly positioned in the hole, it is however necessary to support and hold the dowel therein until the mixture sets.

This prior-art method has the drawback that it requires a considerably amount of time. It will be appreciated that, in many applications where a great plurality of these dowels are required to be installed, that the loss of time and the additional labor expenses are very considerable. Furthermore, this prior-art cementing technique cannot utilize expansion anchor devices since their leading end faces must be closed so that they can be pressed into the cement mixture.

For all of the above considerations, the only time that dowels are generally cemented into walls is in the mass-production of pre-fabricated concrete parts. In this mode of production, the dowels are positioned in place by means of spikes or pins which are pre-arranged on slabs. The pins are positioned into the respective inner passages of the dowels and thereby hold the dowels in place until the cement has hardened. This approach, as the others described above, has the disadvantage of requiring additional holding elements.

Finally, in the aforementioned application having Ser. No. 616,072, the applicant has proposed mounting an object to a support structure by inserting an anchor member into an anchoring hole and injecting a hardenable substance through an interior passage of the anchor member and from there to the exterior of the latter so as to fix the anchor member in the hole upon the curing of the hardenable substance.

Although this approach is generally effective in accomplishing its intended purpose, difficulties have arisen. First of all, the hardenable substance takes a long amount of time to cure properly. Thus, before mounting an object to the support structure, one is required to wait for a considerable amount of time to elapse. In addition, the interior hollow cavities of the block-like support structure have generally been completely filled with the hardenable substance. This is particularly wasteful when the structure has very large cavities.

SUMMARY OF THE INVENTION

Accordingly, it is a general object of the present invention to overcome the disadvantages of the prior art.

More particularly, it is an object of the present invention to provide a method and an arrangement for fixedly securing dowels to a low-strength support structure.

An additional object of the present invention is to provide a method and an arrangement for fixedly securing an object to a low-strength support structure without subjecting the support structure to crumbling.

Still a further object of the present invention is to quickly fix dowels in position so that one is not required to wait for long periods of time.

Yet another object of the present invention is to provide an anchor member which is utilizable for sealing the anchoring hole of a low-strength support structure against outflow of the cement mixture.

Yet a further object of the present invention is to eliminate the necessity for completely filling the hollow interior cavities of a block-like supporting structure.

An additional object of the present invention is to provide an anchoring arrangement which is simple in operation and economical in manufacture.

In keeping with these objects and others which will become apparent hereinafter, one feature of the invention is embodied in providing an anchoring hole in a support structure; inserting a smaller diameter anchor member or dowel with clearance into this anchoring hole, the anchor member having an internal passage extending from its leading end towards its trailing end and communicating with the anchoring hole; and inserting a device into the passage of the anchor member for injecting a quick-setting substance into the passage and from there to the immediate exterior of the anchor member so that the quick-setting substance forms a plug thereabout and partially fills the clearance and prevents withdrawal of the anchor member from the anchor hole upon the curing of the quick-setting substance.

This feature overcomes the prior art drawbacks and achieves the aforementioned objectives in a novel manner. By inserting a smaller diameter anchor member having a sleeve portion which has a cross-section which is equal to or slightly less than the internal cross-section of the anchoring hole in the support structure, the anchor member need not be held in place by any special means.

Moreover, by injecting a quick-setting substance into the internal passage of the anchor member and thereupon to the exterior of the anchor member, the quick-setting substance can quickly form a plug or sheath about the anchor member and fix the latter when the substance hardens. Thus, if a quick-setting substance such as polyurethane is utilized, then the breaking strength of the inner circumferential wall of the anchoring hole in the low-strength support structure will be substantially increased. Furthermore, the use of a quick-setting substance, which preferably begins to cure as soon as it emerges from the interior passage of the anchor member, obviates the necessity for completely filling the entire interior of a cavity of a block-like support structure. The plug serves an an abutting surface for engaging the rear sides of the partition walls of the support and thus requires one to exert a large extraction force in order to remove an object from the support.

Another feature of the invention is embodied in providing a flange portion at the trailing end of the anchor member. One function of the flange portion is to cover the anchoring hole and to serve as a seal against outflow of the quick-setting substance. Another function of the flange portion is to serve as an abutment surface for a shoulder of the injection device. Consequently, the degree of insertion of the injection device into the interior passage of the anchor member is easily controlled. It is desirable to place the outlet nozzle of the injection device in the forward region of the anchor member so that the quick-setting substance can be conducted through the open front end of the anchor member, either by a slot or a slit in its end face, or through a split in the side walls of the anchor member, to partially fill up the clearance bounded by the side walls of the anchor member and the inner circumferential wall of the anchoring hole.

Still another feature of the injection device is that the cross-section of its outlet nozzle is substantially equal to or slightly less than the cross-sectional dimension of the internal passage within the anchor member. This feature ensures that the passage remains empty after the quick-setting substance has been injected and the injection device removed. Thus, a mounting screw can be screwed into this passage even after the quick-setting substance has set.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a partially-broken, partially-sectioned side view of an exemplary embodiment according to the present invention.

DESCRIPTION OF THE PREFERRED EMBODIMENT

Referring jointly to the method and the arrangement for mounting an object to a low-strength supporting structure using a dowel or expansion anchor, it will be seen that, in the single FIGURE, reference numeral 1 identifies an aerated, porous wall block having internal cavities 5 separated by partition walls. Although the present invention will be discussed with reference to such porous walls, it will be appreciated that the present invention is not intended to be limited thereby and can, in fact, be utilized with any low-strength support structure which has interior hollow areas and which has a relatively low resistance to crumbling when force is applied thereto.

Referring again to the single FIGURE, an anchoring hole 2 is provided in block 1 by boring or a similar drilling operation. An anchor member or dowel 3 has a sleeve portion which is insertable into the hole 2 and which has a cross-section which is substantially equal to or slightly less than the cross-section of the hole 2 so that a very slight clearance is defined.

The anchor member 3 bounds an internal bore or passage which extends from its leading end towards its trailing end. The cross-section of the passage is substantially equal to or slightly less than the cross-section of a nozzle of an injection device. Details of the injection device can be had by reference to applicant's aforementioned parent application, the entire contents of which are hereby incorporated by reference.

The device is operative for injecting a quick-setting substance or filler 6, under pressure, into the passage towards its leading end from the interior to the exterior of the anchor member 3. The quick-setting substance 6 can be any foamable plastics material. For example, polyurethane which is comprised of at least two component elements can be preferably used.

In this case, the two fluid constituent parts of the polyurethane material are contained in separate containers within the injection device. During the injection process, the two constituent parts are mixed together in the nozzle of the device, whereupon the foaming process begins. The parts quickly begin to cure and, preferably, at the time that they emerge from the interior passage of the anchor member. The anchor member 3 also has a flange portion 4 at its trailing end to act as an abutment surface for the shoulder or conically-shaped collar of the device. Thus, the extent of insertion of the nozzle towards the front region of the passage is controlled. In addition, the flange portion 4 covers the hole 2 and seals the same against outflow of any of the substance 6 which is still in the fluid state.

Thus, in operation, the anchor member 3 is inserted into the hole 2 as far as the flange portion 4 will permit. Depending upon the size of the interior cavity 5 and upon the length chosen for the anchor member 3, the leading end of the anchor member 3 can be either entirely in one or in more than one cavity, or simultaneously located in several cavities. The leading end of the anchor member 3 is open to conduct the substance 6 to its immediate exterior by means of either a slot or slit in its end face at its leading end, or by means of a split 10 in the side walls of the sleeve portion.

Next, the nozzle of the device is inserted into the interor passage until its shoulder abuts against the flange portion 4 and is operative, as noted above, for spraying the two constituent parts of the substance 6 from their separate containers into the interior and thereupon to the immediate exterior of the anchor member so that the quick-setting substance 6 will encase the anchor member 3 and form a plug or sheath thereabout upon the setting of the substance 6. It will be further understood that an additional adhesive constituent element can be mixed with the aforementioned two constituent parts of the quick-setting substance 6 in order to improve the adhesive action, particularly when very porous materials such as expanded clay is used.

As shown in the FIGURE, the anchor member 3 penetrates a single cavity 5. However, it will be undestood that the split 10 may extend to more than one cavity 5 and, in that case, the substance 6 will then form plugs behind the partition walls of all the cavities 5 having access to the split 10.

At this point, the injection device is removed, and the passage will be substantially free of any substance 6, because the dimensions of the nozzle, as previously explained, prevents the substance 6 from flowing into the passage. A screw, such as the one identified by reference numeral 22 can now be screwed into the passage to mount an object such as a panel 28.

With the teaching of the present invention, the extraction values for the anchor member after the substance has hardened is vastly superior to the withdrawal values of the prior art fixing elements used until now for aerated cement. The problem of slippage of the anchoring members of the prior art has been substantially eliminated. By expanding the anchor member, a very good anchorage is obtained without causing the material of the low-strength support structure to crumble.

It will be understood that each of the elements described above, or two or more together, may also find a useful application in other types of constructions differing from the types described above.

While the invention has been illustrated and described as embodied in a method and arrangement for mounting an object to a low-strength support structure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific objects of this invention.

I claim:

1. A method of installing an expansion anchor member in a low-strength support structure having internal cavities bounded by walls, comprising the steps of providing an anchoring hole in the support structure; inserting a leading end portion of an expansion anchor member having an internal passage and leg portions into the hole so that a leading end region of the passage communicates with an internal cavity of the structure; providing an injection device with a source of quick-setting substance; inserting the injection device into a trailing end region of the passage; only partially filling the internal cavity with the quick-setting substance by actuating the injection device and injecting the quick-setting substance through the passage to the circumambient region of the leading end portion of the expansion anchor member at a rate such that hardening of the quick-setting substance begins upon the emergence of the substance into the internal cavity and is completed upon the partial filling of the same, so that the quick-setting substance forms about the leading end portion of the expansion anchor member a plug which prevents withdrawal of the expansion anchor member from the anchoring hole and relative to the internal cavity, said plug surrounding the leading end portion of the anchor member but being spaced from the walls of a respective cavity; removing the injection device from the passage of the anchor member; and screwing a mounting screw into the passage of the anchor member only after the injected quick-setting substance is hardened, so that the leg portions move apart from one another by a limited distance and the screw becomes secured in the anchor member.

2. A method as defined in claim 1, and further comprising the step of sealing said anchoring hole against outflow of said quick-setting substance by providing a flange portion at a trailing end portion of said expansion anchor member.

3. A method as defined in claim 1, wherein said step of partially filling said cavity includes the step of injecting a foamable plastics material comprising at least two components through said passage.

4. A method as defined in claim 3, wherein said step of injecting includes mixing said two components.

5. A method as defined in claim 3, wherein said step of injecting comprises injecting polyurethane through said passage.

6. A method as defined in claim 3, wherein said step of injecting said two components includes passing the latter through said passage at a rate so that they begin to cure at the time that they emerge therefrom.

* * * * *